United States Patent [19]

Morris et al.

[11] E Re. 31,057

[45] Reissued Oct. 12, 1982

[54] CHROMIUM-DOPED BERYLLIUM ALUMINATE LASERS

[75] Inventors: Robert C. Morris, Ledgewood, N.J.; Carl F. Cline, Walnut Creek, Calif.

[73] Assignee: Allied Chemical Corporation, Morris Township, Morris County, N.J.

[21] Appl. No.: 967,172

[22] Filed: Dec. 6, 1978

Related U.S. Patent Documents

Reissue of:

[64] Patent No.: 3,997,853
Issued: Dec. 14, 1976
Appl. No.: 528,053
Filed: Nov. 29, 1974

[51] Int. Cl.[3] ..... H01S 3/16

[52] U.S. Cl. ..... 372/41

[58] Field of Search ..... 331/94.5 E, 94.5 F

[56] References Cited

U.S. PATENT DOCUMENTS 3,866,142 2/1975 Cline et al. ..... 331/94.5 F

*Primary Examiner*—William L. Sikes
*Attorney, Agent, or Firm*—Ernest D. Buff; Gerhard H. Fuchs

[57] ABSTRACT

Single crystals of chromium-doped beryllium aluminate find advantageous use in optical applications and, in particular, in lasers capable of operating at room temperature.

4 Claims, 2 Drawing Figures

CHROMIUM-DOPED BERYLLIUM ALUMINATE LASERS

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to lasers, and, more particularly, to the use of single crystal chromium-doped beryllium aluminate in laser applications.

2. Description of the Prior Art

The use of lasers in science and industry has received wide acceptance in an ever increasing variety of applications. Lasers have found use in such diverse areas as range finding apparatus, optical surgery and metal drilling. Briefly, lasers operate on the principle of light amplification through stimulated emission of radiation and can create extremely intense concentrations of light. The coherent light beam produced in a laser cavity is amplified in a laser host material. Materials which have been used as laser hosts include gases, liquids, glasses and single crystalline solids.

When single crystalline solids are utilized in lasers, the crystals are generally in the form of elongated rods. The structure of the crystalline material must be very nearly perfect, since any optical inhomogeneities will cause distortion and scattering of the laser beam and thereby reduce the intensity and coherence of the radiation. Imperfections in the crystal which adversely affect lasing performance include elastic strain, crystal misorientations, chemical concentration inhomogeneities, dislocations, inclusions and bubbles.

The first room temperature laser, disclosed several years ago, utilized $Al_2O_3:Cr^{3+}$ (ruby). In more recent developments, room temperature lasers have been fabricated from rare earth ion-doped materials. Examples include $Y_3Al_5O_{12}:Nd^{3+}$ (YAG:Nd) and $Y_2Al_2O_6:Nd^{3+}$ (YALO:Nd).

Attempts have been made to synthesize other $Cr^{3+}$-doped materials for laser applications. For example, the growth of single crystal chromium-doped beryllium aluminate ($BeAl_2O_4:Cr^{3+}$) for possible use as a laser host has been disclosed by R. C. Linares in "Research and Development of New Laser Materials" in a report to the Air Force Cambridge Research Laboratories, AD-611177 (AFCRL-64-971), dated Oct. 30, 1964. It was found, however, that this material did not exhibit lasing action. While other chromium-doped materials, such as $Y_3Al_5O_{12}:Cr^{3+}$, have evidenced lasing at low temperatures such as 77° K., nevertheless, with the exception of ruby, no chromium-doped materials have heretofore been successfully used as room temperature laser hosts.

SUMMARY OF THE INVENTION

In accordance with the invention, single crystal chromium-doped beryllium aluminate ($BeAl_2O_4:Cr^{3+}$) having certain crystallographic orientations may be used as a room temperature laser host. More specifically, it has been discovered that the $BeAl_2O_4:Cr^{3+}$ crystals exhibit lasing action only with the proper selection of crystallographic orientation and $Cr^{3+}$ concentration. Lasing occurs only in rods of $BeAl_2O_4:Cr^{3+}$ crystals oriented along directions substantially in or near the a–c plane and for $Cr^{3+}$ concentrations ranging from about 0.005 to 1.0 atom percent, and preferably, from about 0.01 to 0.10 atom percent.

This laser host is superior to ruby, as evidenced by its greater slope efficiency and lower lasing threshold. Furthermore, such single crystals of $BeAl_2O_4:Cr^{3+}$ can be prepared at lower temperatures than ruby (1870° C. as compared with 2040° C.), and the $BeAl_2O_4:Cr^{3+}$ crystals do not evidence coring and other substructural defects, which are common to ruby.

DETAILED DESCRIPTION OF THE INVENTION

Figure 1:
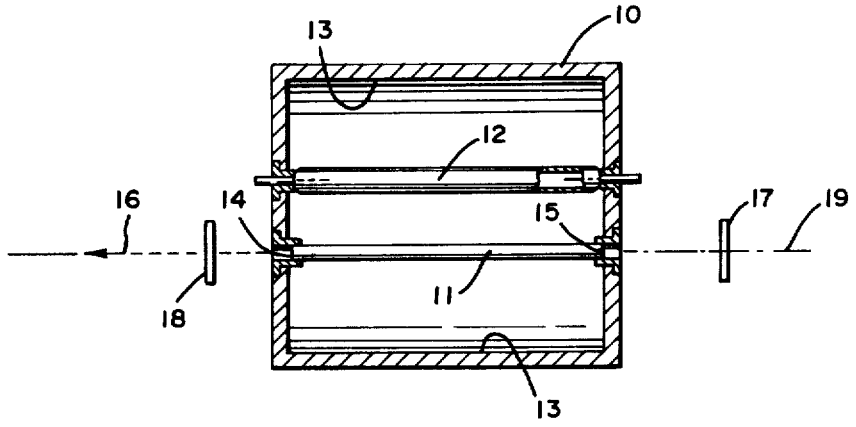
FIG. 1 is a diagrammatic illustration in partial cross-section of typical laser apparatus employing a chromium-doped beryllium aluminate crystal of the present invention as a laser oscillator.

The term "single crystal" of beryllium aluminate is herein meant to define crystals having a minimum lineal cross-sectional dimension of about 0.1 inch and a minimum lineal longitudinal dimension of about 1.0 inch. While crystals commercially employed as laser hosts are normally at least 0.1 inch by 1.0 inch in dimension, this should not be considered limiting. Thus, the crystals of the present invention employed as laser hosts are limited in size only in that they must be single crystals. Where the chromium-doped beryllium aluminate single crystals of the present invention are employed as laser hosts, it is preferred that such crystals be of high optical quality, that is, such crystals should be almost free of defects such as bubbles, strain, metallic or non-metallic oxide second phase inclusions and low angle grain boundaries and should generally contain no more than about 1000 ppm by weight of impurities, and preferably no more than about 25 ppm. In addition, the single crystals of chromium-doped beryllium aluminate of high optical quality which are preferably employed as laser hosts may generally be characterized as being defect- and impurity-free to the extent that optical losses caused by such defects and impurities are not greater than about 0.005/cm, and preferably not greater than about 0.0025/cm.

Beryllium aluminate ($BeAl_2O_4$; also known as chrysoberyl) has a structure that is isomorphous with olivine ($(Mg.Fe)_2SiO_4$). The oxygens form a distorted hexagonal close-packed array in which one-eighth of the tetrahedral interstices are occupied by beryllium, and one-half the octahedral sites are filled by aluminum. The space group of the structure, as previously determined by others, is Pnma, orthorhombic, with four molecules per unit cell. The lattice parameters are a=9.404, b=5.476, and c=4.427 A. Chromium ions replace aluminum ion in the structure.

Single crystals of chromium-doped beryllium aluminate may be conventionally grown by any of various melt-growth processes, including the Bridgman, the float-zone, the Kyropoulos, the Verneuil and the Czochralski growth techniques, as well as suitable modifications of any of those. For Czochralski growth, material for growing a single crystal is placed in a crucible and heated to a temperature sufficient to form a liquid, which is usually maintained at a temperature about 1° to 2° C. above the melting point of the material. A single crystal "seed", substantially of the same composition as the melted material, is placed in contact with the surface of the liquid. The liquid begins to solidify to form the single crystal, which is then rotated and slowly withdrawn, or pulled, from the liquid to obtain crystals of substantial length. The Czochralski growth of chromium doped beryllium aluminate crystals may be performed in any of usual apparatus available for this technique.

In the growth of a single crystal of chromium-doped beryllium aluminate of the present invention, the starting materials, e.g., $Al_2O_3$, BeO and chromium-dopant, are placed in a suitable refractory container or crucible and are heated until the mixture is molten. The chromium-dopant may be one of the dopant-compounds usually employed in the art, such as chromic oxide ($Cr_2O_3$). In order to obtain chromium-doped beryllium aluminate crystals of high quality, it is, of course, necessary to employ starting materials of high purity. Thus, to obtain the high quality crystals of the present invention, the starting materials should contain no more than the following maximum concentrations of impurities, indicated in parts by weight based on the starting material: $Al_2O_3$, 1000 ppm impurities, and preferably 25 ppm; BeO, 2000 ppm impurities, and preferably 100 ppm; and chromium-dopant compound, 3000 ppm impurities and preferably 100 ppm.

The container or crucible is constructed of refractory material having a melting point higher than the melting point of the starting material mixture. Additionally, the crucible should be able to withstand thermal shock and be substantially chemically inert to the molten starting material. While a number of substances may be employed as crucible material, iridium is preferred. It is also preferred that a nearly inert atmosphere be maintained around the crucible to minimize the likelihood of excessive oxidation of crucible materials and the consequent entrainment of metallic inclusions into the melt which act as optical scattering centers in the grown crystal, thereby decreasing its usefulness as a laser host. Such an atmosphere may comprise an inert gas such as, for example, argon, helium, neon, krypton and nitrogen, containing from about 20 to 10,000 ppm $O_2$.

The temperature to which the solid starting materials should be heated to form a melt is generally about 1870° C. Heating of the starting material to the desired melt temperature is preferably accomplished by inductive electrical heating. Other methods of heating can be employed, however, if they are readily controllable and do not contaminate the growing environment of the crystal. In the inductive heating technique, the crucible is employed as a susceptor in an alternating electric field. Currents are induced in the susceptor crucible and thus heat the crucible to a high temperature, whereby the contained starting material is heated by conduction and radiation. Inductive heating can be employed at atmospheric pressure or at pressure above or below atmospheric. Alternatively, the crucible can be heated by direct application of electrical potential and thus cause resistance currents to pass through the crucible. The crucible may also be heated by radiation from resistance heating elements such as resistance wires of noble or refractory metals. It is of extreme importance in all these heating techniques to guard against contaminating the crystal growing environment and means should be provided as well to allow for the introduction and maintenance of the desired atmosphere above the melt. Once the starting material becomes molten, convection currents within the melt tend to stir the melt and homogenize the melt composition.

A single crystal seed having desired composition and desired crystal orientation is then placed in contact with the surface of the melt. While suitable seeds may include beryllium aluminate and iridium wire, the seed preferably has the same composition and crystallographic orientation as that of the desired single crystal product. A small portion of the seed melts and a temperature gradient is established between the solid portion of the seed and the melt. The seed is then slowly rotated and withdrawn from the melt while material from the melt solidifies at the interface between the solid crystal and the melt. The temperature gradient in the solid phase immediately adjacent to this interface is maintained at a value which enables desired growth conditions to be obtained. As the seed is withdrawn, an elongated single crystal is grown.

To obtain high quality crystals it is preferred that the melt temperature be precisely controlled during the growth of the crystal to within ±0.5° C. of the preselected temperature in order to avoid the formation of inhomogeneities in the grown crystal, such as bubbles and stress concentrating surface flaws which could later result in crystal fracture during cooling. This temperature control may be accomplished by well-known means, such as by controlling the generator power output with a precision, three mode temperature controller, the input of which is the melt or crucible temperature as measured by a silicon optical pyrometer or some measure of the generator power itself.

After a completely molten charge is obtained, the temperature is adjusted to the desired initial growth temperature, which for chromium-doped beryllium aluminate is about 1870° C. The seed is then slowly lowered into contact with the melt surface. Pulling of the crystal is then begun and during the initial growth period the average measured temperature of the melt is slowly reduced from the initial growth temperature by approximately 10° C. in order to gradually increase the crystal diameter. After the desired crystal diameter is attained, the melt temperature of the crystal-melt interface is held substantially constant for the remainder of growth. For the growth of a chromium-doped beryllium aluminate crystal, the maximum pulling rate can be determined by the onset of the formation in the crystals of defects, such as bubbles, voids, or inclusions in the crystal. Typically, the pulling rate must generally be less than about 0.25 in/hr. Consistent with growing at as high a rate as possible and obtaining a high yield of acceptable crystals, a pulling rate of about 0.10 in/hr is preferred.

The rate of rotation of the seed rod and growing crystal may be generally between 5 and 100 rpm and preferably between 20 and 50 rpm. The rotation rate for the growth of a crystal of a given diameter and doping level is generally selected so as to produce a flat crystal-melt interface. This selected rotation rate will increase with decreasing crystal diameter and decreasing doping level. For example, a crystal rotation rate of 35 rpm is found to produce a nearly flat interface on 0.75 inch diameter crystals containing 0.05 atom percent $Cr^{3+}$.

While any of the crystallographic orientations of chromium-doped beryllium aluminate can be grown by, for example, the Czochralski technique, only rods oriented along directions in or near the a–c plane are capable of room temperature lasing. In particular, the intensity of the laser is strongest for rods oriented in the a–c plane; the intensity falls off for crystallographic orientations approaching the b-axis. Thus, in accordance with the invention, the orientation should be substantially along the a–c plane, at least 30° removed from the b-axis, and preferably should be substantially in the a–c plane for maximum laser intensity. Further in accordance with the invention, lasing occurs for $Cr^{3+}$ concentration levels ranging from about 0.005 to 1.0 atom percent. At $Cr^{3+}$ concentration greater than about 1.0 atom percent, life-time reduction may occur, while at $Cr^{3+}$ concentration less than about 0.005 atom percent, there is insufficient $Cr^{3+}$ to support lasing. Optimum intensity is obtained where the $Cr^{3+}$ concentration ranges from about 0.01 to 0.10 atom percent, and accordingly, this range is preferred.

The use of single crystal $BeAl_2O_4:Cr^{3+}$ as a laser host offers several advantages over ruby. First, the melting point of $BeAl_2O_4$ is about 1870° C. while that for $Al_2O_3$ is about 2040° C. This means that single crystal of $BeAl_2O_4$ can be grown at a lower temperature, with consequent economic savings in furnace and crucible material and in furnace power. Second, $BeAl_2O_4:Cr^{3+}$ evidences a lower lasing threshold than ruby by about 50 to 100 joules. Typically, a threshold of about 40 to 50 joules has been observed for $BeAl_2O_4:Cr^{3+}$; the corresponding value for ruby is about 150 to 170 joules. Third, the slope efficiency of $BeAl_2O_4:Cr^{3+}$ is greater than that of ruby. A value of 0.18% has been measured for $BeAl_2O_4:Cr^{3+}$; the corresponding value for ruby is about 0.12% measured under similar conditions. And fourth, the $BeAl_2O_4:Cr^{3+}$ crystals do not evidence coring and other substructural defects, which are common to ruby.

As is well known to those skilled in the art, solid state lasers operate on the principle of light amplification through stimulated emission of radiation. The active ion utilized in the lasers of this invention is chromium in the trivalent (+3) state. While the precise configuration of the components of a laser device varies widely, typical laser apparatus in which the chromium-doped beryllium aluminate crystals of the present invention may be employed as a laser is illustrated in FIG. 1.

Referring to the optically pumped laser apparatus illustrated in FIG. 1, laser host 11, consisting of a chromium-doped beryllium aluminate crystal of the present invention, and pumping source 12, e.g. a xenon gaseous discharge pumping source, are housed in container 10 which has a highly reflective inner surface 13 and which defines an elliptical cavity. The laser host 11 and the pumping source 12 are each located at a focal point of the ellipse formed by container 10. Laser host 11 is provided with coated ends 14 and 15 having a conventional dielectric anti-reflection coating. Completely reflecting mirror 17 and partially reflecting mirror 18 are positioned external to container 10 about cylindrical axis 19 of laser host 11. Lasing action is evidenced by emission of coherent radiation, shown as arrow 16, which emanates from partially reflecting mirror 18. Alternatively, ends 14 and 15 may be coated with a conventional reflectance coating to provide partially reflecting end 14 and completely reflecting end 15.

Figure 2:
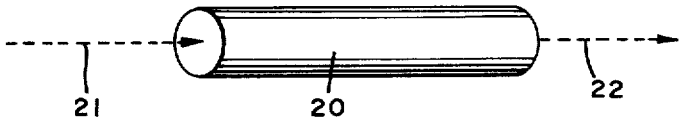
FIG. 2 is a view of a rod fabricated from a single crystal of chromium-doped beryllium aluminate of the present invention useful as a laser amplifier.

FIG. 2 illustrates a rod 20 fabricated from a single crystal of chromium-doped beryllium aluminate of the present invention, having flat, parallel, polished ends. The device of FIG. 2 acts to amplify within the rod coherent radiation 21 which passes out the other end of the rod as emitted radiation 22. A pump such as pump 12 of FIG. 1, possibly together with a focusing means such as cavity 10 of FIG. 1, neither of which is shown, is also required.

The optically pumped lasers employing the single crystals of chromium-doped beryllium aluminate of the present invention may utilize any suitable optical pumping source, either in pulsed or continuous mode. Examples of suitable optical pumping sources include: gaseous discharge pumping sources, such as gaseous discharge pumping sources employing xenon, and/or krypton; coherent and incoherent semiconductor diode emitters such as gallium arsenide and gallium phosphide; and metallic vapor sources such as cesium, rubidium, and/or potassium.

EXAMPLES

1. A single crystal of beryllium aluminate doped with about 0.05 atom percent $Cr^{3+}$ and having a diameter of about 1.75 inch was grown by the Czochralski technique. High grade BeO, $\alpha$-$Al_2O_3$ and $Cr_2O_3$ were melted in a 2-inch diameter iridium crucible in a nitrogen atmosphere containing 2000 ppm $O_2$ at a temperature of about 1870° C. A 0.125 inch diameter seed crystal having a b-axis orientation was used to initiate crystal growth. The crystal was pulled at a rate of 0.075 in/hr, using a rotation rate of 35 rpm.

A b-axis rod of dimensions 0.25 inch diameter by 1.2 inch length with polished and mirrored ends was prepared from the above crystal, using well-known techniques. The rod was placed in an optically pumped apparatus, using a pulsed xenon flash lamp. No lasing was observed up to 450 joules input to the flash lamp.

2. A single crystal of beryllium aluminate doped with about 0.03 atom percent $Cr^{3+}$ and having a diameter of about 1.0 inch was grown as above, except that a 3-inch diameter iridium crucible and a seed crystal having a c-axis orientation were used.

A c-axis rod of dimensions 0.2 inch diameter by 2.3 inch length, prepared from the above crystal, was successfully lased at room temperature [. Lasing occurred at a wave length of 6804 A.] *as seen by its producing a beam of coherent red light upon excitation.* The threshold was 40 joules and the slope efficiency was 0.18%.

What is claimed is:

1. In a laser capable of operating at room temperature comprising:

a. a laser host comprising at least one single crystal incorporating a dopant; and b. means for exciting atoms of the dopant to emit coherent radiation, the improvement which comprises utilizing as the laser host, a single crystal of beryllium aluminate ($BeAl_2O_4$) doped with trivalent chromium ions, the single crystal being crystallographically oriented substantially along the a–c plane, at least 30° removed from the b-axis, and having a chromium doping concentration ranging from about 0.005 to 1.0 atom percent.

2. The laser of claim 1 in which the single crystal of chromium-doped beryllium aluminate is crystallographically oriented substantially in the a–c plane.

3. The laser of claim 1 in which the concentration of chromium doping ranges from about 0.01 to 0.10 atom percent.

4. A laser according to claim 1, further comprising an optical resonant cavity for supporting coherent radiation emitted by the laser host.

* * * * *